United States Patent Office 3,058,809

Patented Oct. 16, 1962

3,058,809

METHODS FOR MAKING BORON NITRIDE MATERIALS

Kenneth M. Taylor, Lewiston, N.Y., assignor to The Carborundum Company, Niagara Falls, N.Y., a corporation of Delaware No Drawing. Filed Dec. 5, 1957, Ser. No. 700,750
8 Claims. (Cl. 23—191)

This invention relates to boron nitride materials having novel properties and to methods of making them. It further relates to boron nitride shapes made from these boron nitride materials and to methods for making them.

This application is a continuation-in-part of my earlier application Serial No. 413,968, filed March 3, 1954, now abandoned.

Boron nitride as a material is not new. The literature is replete with suggestive methods for the manufacture of boron nitride as a material. However, until recently it had been a generally accepted fact that boron nitride per se cannot be molded into strong articles of various shapes without the use of an extraneous bonding agent, since attempts to mold the boron nitride per se into various shapes had invariably resulted in the formation of bodies which were soft and of such low mechanical strength that they were readily broken or crumbled.

In my U.S. Patent No. 2,808,314, issued October 1, 1957, and my copending U.S. patent application Serial No. 413,969 I disclose methods of making boron nitride material which can be hot pressed to form hard, dense, strong bodies which are highly satisfactory for many uses. A typical analysis of this boron nitride material is as follows.

| Constituent: | Amount, percent |
|---|---|
| Boron | 41.45 |
| Nitrogen | 44.00 |
| Free boric acids (calculated as $H_3BO_3$) | .75 |
| Silica | .28 |
| Calcium | Trace |
| Phosphate ($PO_4$) | Trace |
| Material volatile at 110° C. | .26 |

Inasmuch as 44.00% of nitrogen will combine with only about 34% boron to form boron nitride of the chemical formula BN, it is apparent that this boron nitride material contains about 7.45% excess boron present in some form other than boron nitride. Only a small percentage (.75%) of the excess boron is present in the form of free boric acids. This material as made contains no substantial amounts of alcohol-soluble or water-soluble material.

However, bodies hot pressed from the boron nitride material per se contain about 15–20% alcohol-soluble material even though the initial boron nitride material is treated to remove all such material and the bodies are fired in a non-oxidizing inert atmosphere such as nitrogen or helium. Because of the high percentage of alcohol-soluble material in these hot pressed boron nitride bodies, they have very poor resistance to alcohols and water, rapidly disintegrating when submerged in water. As also disclosed in my copending patent application Serial No. 413,967 hot pressed boron nitride bodies which are stabilized against attack by water and alcohol can be made from this type of boron nitride material by adding to the raw mixes certain stabilizing additives. While the resultant stabilized boron nitride bodies have excellent resistance to water and alcohol, they are not completely satisfactory for all uses because of the presence of the additive.

It is therefore an object of the present invention to provide stabilized boron nitride material which can be hot pressed per se to form dense hard, strong bodies containing no substantial amounts of alcohol-soluble materials.

It is a further object to provide novel stabilized boron nitride bodies.

It is a still further object to provide methods for making stabilized boron nitride bodies.

These and other objects accruing from the practice of the present invention will become apparent as the description proceeds.

In accordance with the present invention, boron nitride material containing unnitrided boron, such as an oxygen-containing boron compound, is stabilized without destroying its hot-pressability by heating it for a controlled time and temperature in an atmosphere of ammonia to a temperature greater than 1100° C. to nitride part of the unnitrided boron present in the boron nitride material but at a temperature substantially under 1800° C. whereby the resulting material can be hot-pressed to form shaped bodies of high density and strength. The preferred practice of the present invention comprises selecting or preparing an unstabilized boron nitride material and heating it in an atmosphere of ammonia to a temperature greater than 1100° C. but less than 1800° C. for sufficient time to substantially completely nitride all of the unnitrided boron present in the unstabilized boron nitride material thereby forming a hot-pressable stabilized boron nitride material.

As used herein the terms "stabilized boron nitride" and "unstabilized boron nitride" mean boron nitride materials which, upon analysis after heating the materials under pressure in an inert atmosphere to a temperature from 1500–1800° C. for one hour, contain respectively less than about 7% and more than about 7% free $B_2O_3$. Bodies hot pressed from unstabilized boron nitride are not stable in water or alcohol, whereas dense bodies hot pressed from stabilized boron nitride show no deterioration upon prolonged submersion in water or alcohol. The term "under pressure" as used to define the above-mentioned heating conditions means that the material being heated is confined or under sufficient pressure to prevent any substantial losses from the material by volatilization of boric oxide. Material being hot pressed is considered to be "under pressure," as this term is defined. The term "stabilization percentage" as used herein means the percentage of free $B_2O_3$ present in the material upon analysis after heating under pressure in an inert atmosphere to a temperature from 1500° C. to 1800° C. for one hour. As used herein, the term "hot-pressable boron nitride" or the expression "boron nitride capable of being hot pressed" means boron nitride which, when subjected to simultaneous heat and pressure in a mold, will form a dense, hard and strong shaped article having a density of about 2.0 or higher; the term or expression is not intended to include a boron nitride which upon subjection to simultaneous heat and pressure in a mold yields only a soft and weak body of low density substantially under 2.0.

The unstabilized boron nitride material which is used in the preferred practice of the present invention can be made by reacting an oxygen-containing boron compound and ammonia. One such method of making unstabilized boron nitride material comprises making a mixture comprising an oxygen-containing boron compound, such as various boric acids (including anhydrous boric acid), and an acid-soluble diluent which diluent at the temperatures of nitriding does not fuse or vaporize and is substantially inert to the boron compound, ammonia, and the reaction products, heating the mixture to a temperature of 800° C. to 1100° C. in an atmosphere of ammonia for several hours to nitride a predominant proportion of the boron compound to form boron nitride, and then leaching the boron nitride-containing reaction product successively in dilute acid, alcohol and water. The mixture of raw material is preferably pelletized by moistening with water and forming into porous pellets or agglomerates such as by forcing the moistened mixture through a coarse mesh screen and drying prior to the nitriding operation. I have found that if the nitriding operation is carried on at too high a temperature for too long a time the resulting boron nitride material cannot be satisfactorily hot pressed to form a strong body having a density of about 2.0 or higher, and if the nitriding is done at too low a temperature the resulting product is too soluble in acids and cannot be satisfactorily separated from the other products of the reaction. The temperature of nitriding, therefore, should be maintained around 900° C. for optimum results, although successful nitriding to form hot pressable material has been carried on at temperatures from 800° C. to 1100° C. The resultant unstabilized boron nitride material has a stabilization percentage of 15–20%.

Unstabilized boron nitride can also be made by a process similar to that already described but in which, instead of using an acid-soluble diluent, previously made boron nitride is used as the diluent. This latter process avoids the requirement of an acid leach of the reaction products.

These and other methods may be used to prepare an unstabilized boron nitride material.

The nature of the boron nitride product of the present invention depends upon the conditions prevailing during stabilization and the nature of the boron nitride starting material. The stabilization percentage of the boron nitride product is an inverse function of both the stabilization temperature to which the boron nitride starting material is heated and the duration of heating, and is a direct function of the stabilization percentage of the boron nitride starting material used. That is, the stabilization percentage of the product decreases with increased stabilization temperatures and times and with decreased stabilization percentages of the starting material used. By way of example, Table I below shows the times required to stabilize to a stabilization percentage of 5% unstabilized boron nitride material made in accordance with the described process where an acid-soluble diluent, specifically tricalcium phosphate, was used, the unstabilized boron nitride material having a stabilization percentage of from 15–20%.

TABLE I

| Stabilization temperature, ° C.: | Stabilization time, hours |
|---|---|
| 1200 | 40 |
| 1300 | 5 |
| 1400 | 1 |
| 1500 | ½ |

From Table I it is apparent that to obtain stabilized boron nitride having a predetermined stabilization percentage, shorter stabilization times are required as the stabilization temperature is increased.

In the preferred practice of the present invention, unstabilized boron nitride material, such as the above-mentioned material having a stabilization percentage of about 15–20%, is used and the stabilization is carried on in such a manner that the stabilized product has a stabilization percentage of about 2–5%. Table II shows the approximate times and temperatures required for this preferred practice of the present invention.

TABLE II

| Stabilization temperature, 0° C.: | Stabilization time | |
|---|---|---|
| 1200 | hours | 50 |
| 1300 | do | 8 |
| 1400 | do | 2 |
| 1500 | minutes | 40 |

For some uses, boron nitride having a stabilization percentage somewhat greater than 7% is completely satisfactory, in which case shorter heating times at the various temperatures are sufficient. For example, where the conditions of use of a boron nitride body are not too demanding, boron nitride material which has been treated in accordance with the practice of the present invention so as to have a stabilization percentage of up to about 10% can be hot pressed per se to form satisfactory strong, dense bodies. Also this material can be used in conjunction with a stabilizing additive, in accordance with my United States patent application Serial No. 413,967, as the raw mix for strong dense stabilized bodies containing an additive.

Where the stabilized boron nitride material is to be used as the raw mix for hot pressing strong, dense, hard stabilized boron nitride shaped articles of manufacture, an unstabilized boron nitride material must be used which itself can be hot pressed to form strong, hard unstabilized boron nitride shaped articles. Where reference herein and in the claims is made to dense, hard boron nitride articles or shapes it is intended to mean articles or shapes composed of boron nitride, the articles having a density of at least about 2.0. Unstabilized boron nitride made in accordance with the above-described processes are examples of such hot pressable material.

Furthermore, it has been found that as the stabilization times and temperatures are increased beyond certain limits, bodies hot pressed from the stabilized boron nitride materials are softer and less dense. In other words to obtain hot pressed bodies of predetermined density and hardness, using the same unstabilized boron nitride material, there is a critical time-temperature relationship; that is, there is a critical maximum stabilization time for each stabilization temperature to yield stabilized material which can be hot pressed to form a body of predetermined density. By way of example, Table III below shows the approximate maximum stabilization times at various stabilization temperatures to stabilize the above-described unstabilized boron nitride material, which has a stabilization percentage of 15–20%, so as to obtain stabilized boron nitride which can be hot pressed to form a body having a density not less than about 2.0 g./cc. While stabilization temperatures somewhat higher than those specifically set forth in Table III can be used when coupled with correspondingly shorter holding times for accomplishing stabilization of the unstabilized boron nitride material, for practical operations stabilization temperatures in excess of 1700° C. should be avoided because of the decidedly adverse effect of such higher temperatures upon the capacity of the stabilized material to be hot pressed, regardless of the holding time at the stabilizing temperature. For example, material exposed to a temperature of 1800° C. cannot subsequently be hot pressed per se to form dense, hard boron nitride shapes.

TABLE III

| Stabilization temperature ° C.: | Maximum stabilization time, hours |
|---|---|
| 1200 | 60 |
| 1300 | 16 |
| 1400 | 5 |
| 1500 | 2 |

While it is not definitely known just why there is a critical maximum stabilization time for each stabilization temperature to obtain a stabilized product which can be hot pressed to form a body having a satisfactorily high density, it is believed that the crystal size of the boron nitride is the controlling factor, with smaller crystals hot pressing to give the dense bodies. In accordance with this theory, it is believed that the crystal size of the boron nitride increases upon heating, with the rate of crystal growth being faster at higher temperatures; consequently, the greater the stabilization time and temperature, the larger the crystals in the stabilized product and the less dense the bodies hot pressed therefrom. In fact, if stabilization is carried on for excessively long times at high temperatures, or even for short times at excessively high temperatures, the resultant stabilized boron nitride material cannot be hot pressed per se to form stronger dense bodies. Nevertheless, because as pointed out above the stabilization percentage decreases as the time and temperature of stabilization increases, material which has been stabilized for an excessively long time at high temperature will have an extremely low stabilization percentage, being substantially pure boron nitride. Although not hot pressable per se to form strong bodies, this type stabilized boron nitride material can be used per se where high purity boron nitride is desired, or it can be used in conjunction with other material, such as unstabilized boron nitride or a bonding agent, as the raw mix from which strong dense hot pressed bodies can be made.

Microscopic study of the stabilized boron nitride material made in accordance with the preferred practice of the present invention as outlined in Table II shows the boron nitride to be of very small particle size, with apparently poorly developed crystals. For example, stabilized boron nitride made by firing the aforementioned unstabilized material containing 15–20% alcohol-soluble material in ammonia for 8 hours at 1300° C. had a maximum particle size of about 1.0 micron and an average particle size of about 0.1–0.2 micron, was dull and powdery in appearance, and occurred in agglomerates of small particles rather than in individual crystals. It is believed that material having a maximum particle size up to about 1.5 microns and an average particle size up to about 0.3 micron is hot pressable to form hard, dense bodies, in accordance with the practice of the present invention.

Also in accordance with the present invention, strong dense stabilized boron nitride bodies are made by a process which comprises selecting a granular hot pressable, preferably unstabilized, boron nitride material, stabilizing this material in accordance with the described practice of the present invention, placing a raw mix comprising the stabilized boron nitride material into a mold and heating the mold and contents under pressure to a temperature above 1400° C. to form the desired hot pressed article of manufacture. The raw mix for molding the article may comprise, in addition to the stabilized boron nitride material, unstabilized boron nitride material, or the raw mix may contain only stabilized boron nitride material. Bodies hot pressed from raw mixes containing only boron nitride materials can be considered to be self-bonded inasmuch as no extraneous bonding agent is introduced into the raw mix. Where the raw mix contains only stabilized boron nitride material, the resultant hot pressed bodies comprise substantially pure boron nitride. In the preferred practice of the present invention, bodies are hot pressed from a raw mix consisting of material stabilized in accordance with the practice outlined in Table II above, that is, material having a stabilization percentage of about 2–5%. A molding pressure of at least about 2000 pounds per square inch is preferred although pressures as low as about 500 pounds per square inch can be used satisfactorily. The resultant hot pressed bodies are strong, dense, hard, stable and of extremely high purity, having a compressive strength at room temperature of about 40,000 pounds per square inch, a density of about 2.1 grams per cubic centimeter (as compared with a true density of about 2.25 grams per cubic centimeter for the unpressed stabilized boron nitride), a sand blast penetration of 0.010" or less (as compared with a sand blast penetration of 0.010" for plate glass), and a boron nitride content of about 95% or more. These bodies have superior stability to attack by water, alcohol and acids, there being no apparent signs of deterioration of such bodies after submersion in water for as long as several weeks.

While bodies of the present invention can be hot pressed at temperatures ranging from about 1400° C. apparently all the way up to the sublimation temperature of boron nitride, which is reported in the literature to be about 3000° C., the preferred practice of the present invention embodies the use of temperatures from about 1700° C. to 1900° C. The body should be held at the maximum temperature until maximum density is reached. In hot pressing bodies at these preferred temperatures, it is usually not necessary to hold the pressed body at the maximum temperature for any substantial length of time, complete integration and maximum density usually being reached by the time the maximum temperature is reached. However, with lower pressing temperatures, frequently a short holding period is required to attain maximum density. For example, in hot pressing a body from material stabilized by heating for eight hours at 1300° C., in accordance with Table II, if a temperature of 1500° C. is used during pressing, it is necessary to hold the body at 1500° C. for about one hour to obtain maximum density.

Not only is the holding time cut down by hot pressing at higher temperatures, but also it has been found that the alcohol-soluble content of the hot pressed bodies tends to decrease as the pressing temperatures are increased. If bodies of extremely high purity are desired, it has been found that these may be made by hot pressing at extremely high temperatures, such as above 1900° C., and holding the body at the maximum pressing temperature for an extended length of time. In fact, it has been found that bodies containing substantially decreased amounts of alcohol-soluble material can be made from unstabilized boron nitride material per set by hot pressing a raw mix containing only the unstabilized boron nitride at an extremely high temperature, such as above 1900° C., and holding the body at the maximum pressing temperature for several hours. While the resultant hot pressed body may contain as little as about 5% or less alcohol-soluble material, such bodies are not as hard or dense as the bodies hot pressed from stabilized boron nitride containing the same amounts of alcohol-soluble material.

It has also been found that hard, dense boron nitride bodies made of boron nitride material stabilized in accordance with the present invention have a high degree of directionalism in respect of many of their physical properties. For example, hot pressed bodies made by hot pressing at 2000 lbs. per square inch pressure at 1800° C. and composed of boron nitride material stabilized by heating at 1300° C. for 8 hours were made and subjected to a number of tests with the results shown in Table IV below.

TABLE IV

*Physical Properties of Hot Pressed, Stabilized Boron Nitride Bodies*

[Coefficient of thermal expansion, cm./cm./° C.]

| Temp. Range, Degrees Centigrade | Perpendicular to Pressing Direction | Parallel to Pressing Direction |
|---|---|---|
| 25° C.–350° C. | $0.59 \times 10^{-6}$ | $10.15 \times 10^{-6}$ |
| 25° C.–700° C. | 0.89 | 8.06 |
| 25° C.–1,000° C. | 0.77 | 7.51 |

| Physical Property | Temperature, ° C. | Testing Force Applied perpendicular to direction of forming pressure | Testing Force Applied parallel to direction of forming pressure |
|---|---|---|---|
| Compressive strength, p.s.i. | 25 | 34,000 | 45,000 |
| Modulus of Rupture, p.s.i. | 25 | 7,280 | 15,880 |
| | 300 | 7,030 | 15,140 |
| | 700 | 1,900 | 3,840 |
| | 1,000 | 1,080 | 2,180 |
| Modulus of Elasticity p.s.i.$\times 10^6$ | 25 | 4.91 | 12.36 |
| | 300 | 3.47 | 8.79 |
| | 700 | .51 | 1.54 |
| | 1,000 | ---------- | 1.65 |
| Thermal Conductivity, c.g.s. Units | 300 | .0687 | .0362 |
| | 700 | .0646 | .0318 |
| | 1,000 | .0637 | .0295 |

In order that the invention may be more fully understood, the following specific examples are given:

Unstabilized boron nitride satisfactory for subsequent hot pressing was made by dry mixing 5320 grams of a commercial grade of boric acid (equivalent to 3000 grams of boric oxide) and 3000 grams of a commercial grade of precipitated tricalcium phosphate. The mixture was made into a stiff paste by the addition of approximately 400 ml. of tap water and then pelletized or agglomerated by pressing through a 4-mesh sieve. The resulting small agglomerates of material were dried for two hours at 200° F. followed by drying for three hours at 320° F. The dried pellets were then nitrided by heating in an atmosphere of ammonia in a graphite lined electric muffle furnace for nine hours at 900° C. The flow of ammonia gas was maintained throughout the nitriding operation at a rate of flow of approximately one liter of ammonia per minute per 1200 grams of material.

After nitriding, the pellets were ground to a sufficient fineness to pass through a 60-mesh screen and then treated with dilute hydrochloric acid to dissolve the tricalcium phosphate and other extraneous material. The dilute hydrochloric acid was prepared by mixing five liters of concentrated acid and seventeen and one-half liters of water. The material was kept in the hydrochloric acid, with occasional stirring, for eight hours. It was then allowed to stand overnight to settle the undissolved boron nitride, after which the acid solution was decanted off and a mixture of two liters of concentrated hydrochloric acid and ten liters of water added and occasionally stirred for three hours. After standing for a few hours to allow the solids to settle, the acid solution was decanted off. The undissolved boron nitride was washed several times by decantation with tap water and then with distilled water. The solids were filtered on a Büchner funnel, washed several times with hot 95% alcohol and dried overnight at room temperature followed by a final drying at 300° F. for two hours.

A typical analysis of the recovered boron nitride material is as follows:

| Constituent: | Amount, percent |
|---|---|
| Boron | 41.45 |
| Nitrogen | 44.00 |
| Free boric acids (calculated as $H_3BO_3$)[1] | .75 |
| Silica | .28 |
| Calcium | Trace |
| Phosphate ($PO_4$) | Trace |
| Material volatile at 110° C. | .26 |

[1] Probably present as a mixture of acids such as $HBO_2$, $H_2B_4O_7$ and $H_3BO_3$.

Boron nitride was identified in the resulting material by X-ray diffraction analysis, no other lines than those of boron nitride being found in the diffraction pattern. The material so made is a finely divided, bulky, white powder and electron micrographs of the material indicate that the individual crystals are 0.5 micron and finer in size. The crystal size and chemical inertness increases on heating to higher temperatures during nitriding. The material had a specific gravity of about 2.21. An analysis of this unstabilized boron nitride material, after it was heated in an inert atmosphere under pressure to a temperature from 1500° C. to 1800° C. for about one hour, showed that it contained about 18% alcohol-soluble material, which upon hydrolysis was identified as boric acid. This unstabilized boron nitride material is hot pressable to form strong, dense unstabilized boron nitride bodies.

Numerous samples of this unstabilized boron nitride material were stabilized by heating the material in loose granular form in an atmosphere of ammonia in graphite boats in a combustion tube furnace. Certain of the stabilized boron nitride samples were hot pressed in accordance with the present invention, and various tests were made to determine the properties of the hot pressed bodies. Table V below shows conditions of stabilization of boron nitride samples, conditions of hot pressing bodies from the stabilized samples, and some of the properties of the resultant bodies.

TABLE V

| Run No. | Stabilization Temperature, ° C. | Stabilization Time, hrs. | Molding Temp., ° C. | Molding Pressure, p.s.i. | Body Density, g./cc. | Stabilization percent (percent free $B_2O_3$) | Sand Blast Penetration (Plate Glass—0.010″) |
|---|---|---|---|---|---|---|---|
| | | | | | | | *Inches* |
| 1 | 1,200 | 8 | 1,800 | 2,000 | 2.10 | 9.75 | 0.007 |
| 2 | 1,200 | 18 | 1,800 | 2,000 | 2.11 | 7.59 | 0.006 |
| 3 | 1,300 | 8 | 1,800 | 2,000 | 2.10 | 4.50 | 0.008 |
| 4 | 1,300 | 8 | 1,500 | 2,000 | 2.03 | ------ | ------ |
| 5 | 1,400 | 3 | 1,800 | 2,000 | 1.95 | 2.72 | 0.010 |
| 6 | 1,400 | 8 | 1,800 | 2,000 | 1.83 | 1.74 | 0.014 |

The bodies of runs 1–6 were hot pressed into small shapes such as cylinders 1¼″ long and ⅞″ diameter as follows:

An Ajax high frequency electric furnace was used for hot pressing. It had a graphite crucible heating chamber which was cylindrical in form, with an inside diameter of 4″ and a length of about 11″. The top of the crucible during use was closed by a graphite block and powdered carbon except for an opening ½″ in diameter through which temperature readings were made and an opening through which a graphite plunger passed. Since the heating chamber was graphite, the furnace chamber was considered to be in a reducing atmosphere at high temperatures, consisting chiefly of carbon monoxide and nitrogen.

The raw mixes, which in the above runs consisted of only stabilized boron nitride material, were pressed into cylindrical molds. Each mold had two movable graphite plungers. The raw mix in loose powdered condition was placed in the mold by compressing slightly as the mold was filled. Pressure was applied to the plungers and maintained throughout the heating and cooling periods. The bodies were held under pressure at the maximum temperature until movement of the plungers ceased, indicating that maximum density under the pressing conditions had been reached.

Runs Nos. 1 and 2, and 5 and 6 clearly show that increased stabilization times at the same stabilization temperature give products having lowered stabilization percentages. Runs 1–6 show that probably the most important factor determining the extent of stabilization is the stabilization temperature; material stabilized at 1200° C. for 8 hours (run #1) had a stabilization percentage of 9.75%, whereas material stabilized at 1400° C. for the same length of time (run #6) had a stabilization percentage of only 1.74%, while the run made for eight hours at 1300° C. (run #3) was intermediate in free $B_2O_3$ content. Runs #5 and #6 clearly show the decreased density of bodies made from material stabilized at high temperatures for extended periods of time. The stabilized materials of runs 3, 5 and 6, where less than 5% free $B_2O_3$ is present in the bodies hot pressed therefrom, consist essentially of boron nitride, substantially all boron present in the unstabilized boron nitride having the chemical formula BN. Likewise, the hot pressed bodies of runs 3, 5 and 6 consist essentially of boron nitride, boron nitride being present in these bodies in an amount greater than about 95%.

One sample of material stabilized in accordance with runs 3 and 4 by heating for 8 hours at 1300° C. was analyzed as follows:

| | Percent |
|---|---|
| Nitrogen | 53.3 |
| Boron | [1] 43.3 |
| Calcium | Nil |
| $SiO_2$ | 0.25 |
| Fe | [2] 0.01 |
| $Al_2O_3$ | 0.15 |
| Free $B_2O_3$ | 0.30 |

[1] Total.
[2] Maximum.

A body hot pressed from this material in an inert atmosphere contained 3.48% free $B_2O_3$. By calculation it was determined that the 3.48% free $B_2O_3$ contained 2.4% combined oxygen and 1.08% boron. By adding this 2.4% of combined oxygen to the above analysis it is seen that the sum of these components, exclusive of the free $B_2O_3$, adds up to 99.41%. By subtracting the 1.08% boron present in the free $B_2O_3$ from the sum of the amount of boron and nitrogen present, it appears that this stabilized boron nitride material contained 95.52% boron nitride. Boron nitride was identified in the stabilized boron nitride material by X-ray diffraction analysis, and no lines other than those of boron nitride were found in the diffraction pattern.

To determine the results to be obtained when bodies are made from stabilized boron nitride material by hot pressing at extremely high temperatures for extended periods of time, run #7 was made in which stabilized boron nitride material made in accordance with runs 3 and 4 above was hot pressed at 2000 p.s.i. at a temperature of 2100° C., the body being held at 2100° C. for 1½ hours. The resultant body was found to have a density of 2.04 grams per cubic centimeter, a sand blast penetration of 0.025″, and a free $B_2O_3$ content of 1.67% which free $B_2O_3$ content is substantially less than that found for the body of run #3 which was hot pressed at 1800° C. This indicated that the free $B_2O_3$ content can be decreased by hot pressing the bodies at extremely high temperatures and holding the bodies at the maximum molding temperature for an extended time. In general it appears that the free $B_2O_3$ content can be decreased from about 4% to about 2% by hot pressing the body at temperatures from 2000° C. to 2200° C. for about one hour. Bodies having densities of about 2.0 grams per cubic centimeter and still lower $B_2O_3$ contents can be obtained by holding at pressing temperature for longer times. This effect of decreased from $B_2O_3$ content in the hot pressed bodies has also been noticed in bodies made from unstabilized boron nitride material by hot pressing at extremely high temperatures for extended periods of time, but such bodies have lower densities than those pressed from stabilized material.

To determine whether this effect of lowered $B_2O_3$ content could be obtained by heating a previously pressed body at temperatures of 2000° C. to 2200° C. for extended times without applying pressure, run #8 was made. In this run a body hot pressed in accordance with run #3 was made. After cooling and removing the body from the mold, it was thereafter placed in a furnace and heated to 2100° C. However, before the body could be held at this temperature for the desired 1½ hours it ruptured. This indicated that to decrease the free $B_2O_3$ content by heating the dense body at extremely high temperatures for extended periods of time, it is essential that the body be in a confined space, such as a mold, and under pressure so as to prevent rupture of the body.

Additional tests were run to determine the nature of boron nitride bodies hot pressed from mixtures containing unstabilized boron nitride and stabilized boron nitride which had been stabilized at an extremely high temperature for an extremely long period of time. In these runs, unstabilized boron nitride material made as in the above example was stabilized in accordance with run #6 by firing in an ammonia atmosphere at 1400° C. for eight hours. Portions of this stabilized boron nitride were then mixed by milling with different amounts of the unstabilized boron nitride material to form the raw mix for hot pressed bodies. Bodies were then pressed from these raw mixes at a temperature of 1800° C. and a pressure of 2000 p.s.i. Table VI below shows the compositions of the raw mixes for these runs and the properties of the bodies hot pressed therefrom.

TABLE VI

| Run No. | Raw Mix Composition | Stabilization percent of pressed body (Free $B_2O_3$) | Density, g./cc. | Sand Blast Penetration (Plate Glass 0.010″) |
|---|---|---|---|---|
| | | | | *Inches* |
| 9 | 70% Stabilized BN; 30% Unstabilized BN | 5.48 | 2.02 | 0.005 |
| 10 | 80% Stabilized BN; 20% Unstabilized BN | 4.45 | 2.05 | 0.009 |
| 11 | 90% Stabilized BN; 10% Unstabilized BN | 2.78 | 1.97 | 0.008 |
| 6 | 100% Stabilized BN | 1.74 | 1.83 | 0.014 |

Run #6 is included in Table VI by way of comparison. From this table it is apparent that, whereas the bodies hot pressed from only this material stabilized for an excessive time at a high temperature have relatively low densities, bodies hot pressed from raw mixes comprising in predominant amounts this highly stabilized material and in lesser amounts unstabilized material may have densities of 2 grams per cubic centimeter and more. Furthermore, such bodies hot pressed from both highly stabilized and unstabilized material may have a free $B_2O_3$ content less than 5% and so are highly resistant to water and alcohol. These bodies can be used in place of the bodies hot pressed from raw mixes containing only material stabilized in accordance with the preferred practice of the present invention.

Besides being useful as raw mixes for making hot pressed bodies, the boron nitride material made in accordance with the present invention can be used in loose granular form as high temperature insulation where oxidizing conditions are not encountered. Because of its graphite-like crystal structure it is also useful as a lubricant, particularly where high temperatures are encountered. Furthermore, it can be used as an anti-sticking agent in the making of glass beads and the like. Also, in accordance with this invention hot pressed boron nitride bodies may be made which are suitable for uses such as high temperature bearings, rocket motor combustion chamber and exhaust nozzle linings, high temperature crucibles and other refractory articles, various types of electrical insulators and the like.

Having described the invention in detail it is desired to claim:

1. A method of preparing a stabilized and hot pressable boron nitride which comprises selecting a granular unstabilized boron nitride material made by directly nitriding a mixture of an oxidic compound of boron and a diluent and which upon analysis after heating under pressure in an insert atmosphere to a temperature of from 1500° C. to 1800° C. for one hour contains more than about 7% and up to about 20% free $B_2O_3$, heating said unstabilized boron nitride material in an atmosphere of ammonia at a temperature of 1200° C. to 1700° C. for a period of time sufficient to nitride part of the unnitrided boron compounds present in the unstabilized boron nitride material, and discontinuing said heat treatment while the material has a stabilization percentage of about 2% to 7% and is still capable of being hot pressed, thereby forming stabilized hot pressable boron nitride.

2. The method of making stabilized boron nitride in accordance with claim 1 in which the heating of the unstabilized boron nitride material is at a temperature of from 1200° C. to 1500° C. for sufficient time to nitride substantially all of the boron compounds present in said unstabilized boron nitride material, and the heating is discontinued when the material has a stabilization percentage of about 2% to 5% and is still capable of being hot pressed, thereby forming a stabilized boron nitride material containing at least 95% boron nitride.

3. The method in accordance with claim 1 in which said unstabilized boron nitride material is heated at a temperature from 1200 to 1500° C. for a time in accordance with the following table:

| Temperature in ° C.: | Maximum time in hours |
|---|---|
| 1200 | About 60 |
| 1300 | About 16 |
| 1400 | About 5 |
| 1500 | About 2 |

4. The method in accordance with claim 1 in which said unstabilized boron nitride material is heated at a temperature from 1200 to 1500° C. for a time in accordance with the following table:

| Temperature in ° C.: | | Time |
|---|---|---|
| 1200 | hours | 50 |
| 1300 | do | 8 |
| 1400 | do | 2 |
| 1500 | minutes | 40 |

5. The method of making a hot pressed boron nitride body which comprises selecting a granular unstabilized boron nitride material made by directly nitriding a mixture of an oxidic compound of boron and a diluent and which upon analysis after heating under pressure in an insert atmosphere to a temperature of from 1500° C. to 1800° C. for one hour contains more than about 7% and up to about 20% free $B_2O_3$, heating said unstabilized boron nitride material in an atmosphere of ammonia to a temperature above 1200° C. but below 1700° C. for a sufficient period of time to nitride part of the unnitrided boron compounds present in said unstabilized boron nitride material, discontinuing said heat treatment while the material has a stabilization percentage of about 2% to 7% and is still capable of being hot pressed to form a dense, strong body, thereby forming a stabilized boron nitride product, placing a raw mix comprising said stabilized boron nitride product, into a mold, and heating the mold and its contents under pressure to a temperature above 1400° C. to form the desired hot pressed body.

6. The method of making a boron nitride body in accordance with claim 5 in which the mold and contents are heated under a pressure of at least about 200 p.s.i. to a temperature of 1700° C. to 1900° C. to form the desired hot pressed body.

7. The method of making a boron nitride body in accordance with claim 5 in which the mold and contents are heated under pressure to a temperature of 1900° C. to 2200° C. and held at this temperature for an extended period of time.

8. The method of making a boron nitride body in accordance with claim 5 in which the raw mix for molding comprises a mixture of said unstabilized boron nitride material and said stabilized boron nitride product.

References Cited in the file of this patent

UNITED STATES PATENTS

| | | |
|---|---|---|
| 1,157,271 | Weintraub | Oct. 19, 1915 |
| 2,801,903 | Fetterley et al. | Aug. 6, 1957 |
| 2,808,314 | Taylor | Oct. 1, 1957 |
| 2,865,715 | Kamlet | Dec. 23, 1958 |

FOREIGN PATENTS

| | | |
|---|---|---|
| 483,201 | Great Britain | Apr. 13, 1938 |

UNITED STATES PATENT OFFICE

CERTIFICATE OF CORRECTION

Patent No. 3,058,809 October 16, 1962

Kenneth M. Taylor

It is hereby certified that error appears in the above numbered patent requiring correction and that the said Letters Patent should read as corrected below.

Column 4, line 16, after "strong," insert -- dense, --; column 5, line 2, for "stronger" read -- strong --; column 6, line 27, for "set" read -- se --; column 9, line 4, before "the", first occurrence, insert -- been completely nitrided during stabilization to boron nitride having --; line 58, for "from" read -- free --; column 10, line 70, for "insert" read -- inert --; column 11, line 10, after "for" insert -- a --; column 12, line 1, for "insert" read -- inert --; line 19, for "200" read -- 2000 --.

Signed and sealed this 19th day of March 1963.

(SEAL)
Attest:

ESTON G. JOHNSON
Attesting Officer

DAVID L. LADD
Commissioner of Patents